May 1, 1928. 1,668,434
E. W. TODD
LIQUID TESTING APPARATUS
Filed Nov. 23, 1926
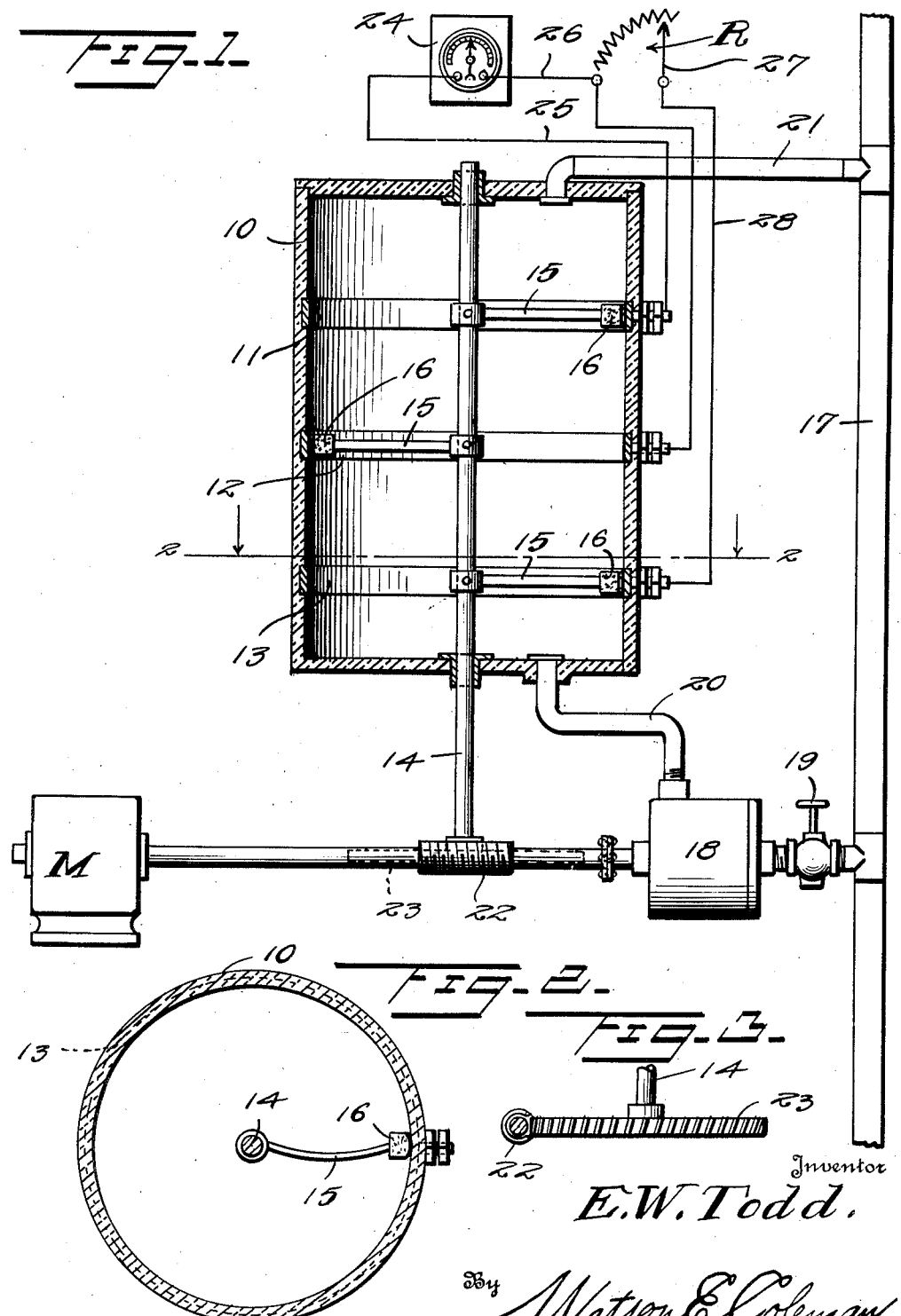

Patented May 1, 1928.

1,668,434

UNITED STATES PATENT OFFICE.

EMERY W. TODD, OF MITCHELL, NEBRASKA.

LIQUID-TESTING APPARATUS.

Application filed November 23, 1926. Serial No. 150,305.

This invention relates to liquid testing apparatus and more particularly to a device for electrically determining the hydrogen ion concentration of liquids.

A more specific object of the invention is to improve the structure of this character illustrated in my prior Patent, No. 1,601,383, granted September 28, 1926, for liquid testing apparatus.

In this patent, I disclose a device having electrodes which are reversely affected by the hydrogen ion concentration and which are employed for determining the acidity or alkalinity of a solution in which they are submerged. One of these electrodes is of iron, while the other electrode is of an alloy of antimony and cadmium. With this alloy, it is difficult to produce electrodes which are properly graduated for the solution in which they are to be employed, or, in other words, would, in combination with the gauge employed, show a zero reading when the solution was at a neutral point. Accordingly, a further object of this invention is the provision of an improved electrode construction eliminating the necessity for the alloyed electrode.

A further object of the invention is to provide a novel and improved means for preventing polarization of the electrodes and a novel mounting for the electrodes whereby depolarization is assisted and rendered much easier of accomplishment.

These and other objects I attain by the construction shown in the accompanying drawings, wherein for the purpose of illustration is shown a preferred embodiment of my invention and wherein:—

Figure 1 is a partially diagrammatic partially sectional view showing testing apparatus constructed in accordance with my invention;

Figure 2 is a section on the line 2—2 of Figure 1;

Figure 3 is a fragmentary sectional view showing the manner of transmitting a drive to the brush operating shaft.

Referring now more particularly to the drawings, the numeral 10 generally designates an electrode chamber which is preferably formed of insulating material and has embedded in the interior wall thereof three electrode rings 11, 12 and 13, only the inner faces of which are exposed at the interior of the chamber. The electrode 11 is of iron, the electrode 12 of antimony and the electrode 13 of cadmium. Extending longitudinally of the chamber 10 is a shaft 14 which, within the chamber, is provided with spring arms 15, the outer ends of which have rubber brushes 16 engaging the inner faces of the electrodes 11, 12 and 13 and moving therealong as the shaft is rotated.

The numeral 17 designates a line through which the solution to be tested is passed to the point where it is to be employed. A pump 18 has its intake connected with this line by a valved conduit 19 and its outlet connected with one end of the chamber 10 by a conduit 20. The opposite end of the chamber 10 is connected with the conduit 17 by a valved conduit 21. The pump 18 is operated from a motor M, which also drives a worm 22 meshing with a worm gear 23 secured to the shaft 14.

A galvanometer gauge 24 is provided, which may be of any ordinary or usual construction, except that the dial thereof is graduated in degrees from a zero center to designate hydrogen ion concentration and, therefore, acidity or alkalinity of the liquid as determined from a desired neutral point. This neutral point need not necessarily designate an actually neutral liquid, but may, if desired, indicate a liquid which is partially alkaline or acid. One of the terminals of this gauge is connected with the binding post of the iron electrode 11 by a lead 25 and the other of the terminals is connected with the binding post of the electrode 12 by a lead 26. A variable resistance R is connected to the lead 26 and its brush 27 is connected to the binding post of the electrode 13 by a lead 28 or may be directly connected thereto. Having a solution which, by any desired test, has been shown to have the proper neutral point, this solution is introduced to the chamber 10 and the brush 27 of the variable resistance R shifted until the gauge reaches zero. At this time, the brush 27 may be fixed or, if the neutral point is subject to change, may be simply left in its set position.

In operation, it will, of course, be understood that the pump 18 will force the fluid from the conduit 17 through the chamber 10 and this fluid, by its contact with the electrodes 11, 12 and 13 will cause a reading to appear upon the gauge 24 showing whether the solution is acid or alkaline, as regards the desired neutral point. During operation of the pump, the shaft 14 will be rotated, so that the brushes 25 will operate continually upon the exposed faces of the electrodes, thus keeping these faces wiped clean from hydrogen bubbles and preventing polarization thereof. The gauge 24, if desired, can be either of the indicating or recording type or may be made to control valves permitting the introduction of acid or alkali to the fluid contained in the conduit 17 to produce the desired solution. It will, of course, be obvious that when the resistance connecting the electrodes 12 and 13 have been properly adjusted, these electrodes act as a single electrode, replacing an electrode formed by alloying the metals.

Many changes being possible in the construction hereinbefore set forth without in any manner departing from the spirit of the invention, I do not limit myself to such specific structure except as hereinafter claimed.

I claim:—

1. Testing apparatus of the type described comprising a primary cell having two electrodes and a solution, the polarity of the output potential of said cell changing as the solution within the cell changes from alkali to acid with respect to a desired neutral point and a galvanometer having its terminals connected with the electrodes, one of said electrodes being formed of two elements one of which is directly connected with one of the terminals of the galvanometer and the other of which is connected therewith through a resistance.

2. Testing apparatus of the type described comprising a primary cell having two electrodes and a solution, the polarity of the output potential of said cell changing as the solution within the cell changes from alkali to acid with respect to a desired neutral point and a galvanometer having its terminals connected with the electrodes, one of said electrodes being formed of two elements one of which is directly connected with one of the terminals of the galvanometer and the other of which is connected therewith through a resistance, said resistance being variable to thereby enable variation of the neutral point which will provide a zero reading of the galvanometer.

3. Testing apparatus of the type described comprising a primary cell having two electrodes and a solution, the polarity of the output potential of said cell changing as the solution within the cell changes from alkali to acid with respect to a desired neutral point and a galvanometer having its terminals connected with the electrodes, one of said electrodes being formed of iron, the other of said electrodes being formed of two separate elements one of which is composed of antimony and the other of which is composed of cadmium, one of said elements being directly connected with the terminal of the galvanometer, the other of said elements being connected therewith through a resistance.

4. Testing apparatus of the type described comprising a primary cell having two electrodes and a solution, the polarity of the output potential of said cell changing as the solution within the cell changes from alkali to acid with respect to a desired neutral point and a galvanometer having its terminals connected with the electrodes, one of said electrodes being formed of iron, the other of said electrodes being formed of two separate elements one of which is composed of antimony and the other of which is composed of cadmium, one of said elements being directly connected with the terminal of the galvanometer, the other of said elements being connected therewith through a resistance, said resistance being variable.

5. Testing apparatus of the type described comprising a primary cell having two electrodes and a solution, the polarity of the output potential of said cell changing as the solution within the cell changes from alkali to acid with respect to a desired neutral point and a galvanometer having its terminals connected with the electrodes, one of said electrodes being formed of iron, the other of said electrodes being formed of two separate elements one of which is composed of antimony and the other of which is composed of cadmium, the element formed of antimony being directly connected with the terminal of the galvanometer, the element formed of cadmium being connected therewith through a variable resistance.

In testimony whereof I hereunto affix my signature.

EMERY W. TODD.